United States Patent
Yang (10) Patent No.: US 9,114,598 B2
(45) Date of Patent: Aug. 25, 2015

(54) METHOD FOR LAMINATING POLARIZATION FILM

(71) Applicant: Shenzhen China Star Optoelectronics Technology Co., Ltd., Shenzhen, Guangdong (CN)

(72) Inventor: Shun Yang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 146 days.

(21) Appl. No.: 13/985,895

(22) PCT Filed: Jun. 26, 2013

(86) PCT No.: PCT/CN2013/078074
§ 371 (c)(1),
(2) Date: Aug. 16, 2013

(87) PCT Pub. No.: WO2014/169527
PCT Pub. Date: Oct. 23, 2014

(65) Prior Publication Data
US 2014/0305578 A1    Oct. 16, 2014

(51) Int. Cl.
*B29C 65/02* (2006.01)
*B29C 65/18* (2006.01)
(Continued)

(52) U.S. Cl.
CPC .............. *B32B 37/06* (2013.01); *B32B 37/003* (2013.01); *B32B 37/0053* (2013.01); *B32B 2307/42* (2013.01); *B32B 2457/202* (2013.01); *G02F 1/133* (2013.01)

(58) Field of Classification Search
CPC ........ B32B 7/06; B32B 27/00; B32B 37/003; B32B 37/0053; B32B 37/06; B32B 37/13; B32B 2307/042; B32B 2457/202; B32B 37/04; B32B 38/0036; B32B 2309/02; B29V 65/02; B29V 65/18; B29C 65/02; B29C 65/18; B29C 66/41; B29C 66/45; B29C 66/47; B29C 66/919; G02F 1/133
USPC .................... 156/247, 249, 289, 308.2, 309.6
See application file for complete search history.

(56) References Cited

U.S. PATENT DOCUMENTS 3,612,551 A * 10/1971 Grabill, Jr. .................... 277/566
5,984,848 A * 11/1999 Hyllberg et al. ................ 492/46

(Continued)

FOREIGN PATENT DOCUMENTS

| CN | 1321908 A | 11/2001 |
|---|---|---|
| CN | 1854844 A | 11/2006 |
| KR | 100771006 B1 | 10/2007 |

*Primary Examiner* — Sing P Chan
(74) *Attorney, Agent, or Firm* — Andrew C. Cheng (57) ABSTRACT

Disclosed is a method for laminating a polarization film, which includes the following steps: (1) providing a substrate and a polarization film, wherein the polarization film comprises a release sheet laminated thereon; (2) with the release sheet being peeled off, bringing the polarization film toward the substrate in such a way that the lamination surface of the polarization film is attached to a starting end of the substrate; (3) providing a roller and heating the roller to 35° C.-70° C.; and (4) softening the polarization film with the heated roller and at the same time, using the roller to roll and press the soften polarization film in order to have the polarization film attached to and laminated on the substrate. The roller, when used to press and laminate a polarization film to a substrate, is kept at a temperature of 35° C.-70° C.

11 Claims, 6 Drawing Sheets

(51) Int. Cl.
  *B32B 37/26* (2006.01)
  *B32B 38/10* (2006.01)
  *B32B 43/00* (2006.01)
  *B32B 37/06* (2006.01)
  *B32B 37/00* (2006.01)
  *G02F 1/133* (2006.01)

(56) References Cited

U.S. PATENT DOCUMENTS

| | | | |
|---|---|---|---|
| 2005/0105159 A1* | 5/2005 | Paolini et al. | 359/252 |
| 2007/0128381 A1* | 6/2007 | Yajima | 428/1.31 |
| 2007/0165157 A1 | 7/2007 | Hong | |

* cited by examiner

METHOD FOR LAMINATING POLARIZATION FILM

BACKGROUND OF THE INVENTION

1. Field of the Invention

The present invention relates to the field of liquid crystal display, and more particularly to a method for laminating a polarization film.

2. The Related Arts

Liquid crystal displays (LCDs) have a variety of advantages, such as thin device body, low power consumption, and being free of radiation, and are thus widely used. Most of the LCDs that are currently available in the market are backlighting LCDs, which comprise an enclosure, a liquid crystal panel mounted in the enclosure, and a backlight module fixed in the enclosure. The operation principle of the liquid crystal panel is that, with liquid crystal molecules interposed between two parallel glass substrates, application of electricity is selectively carried out to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of an LCD. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

Figure 1:
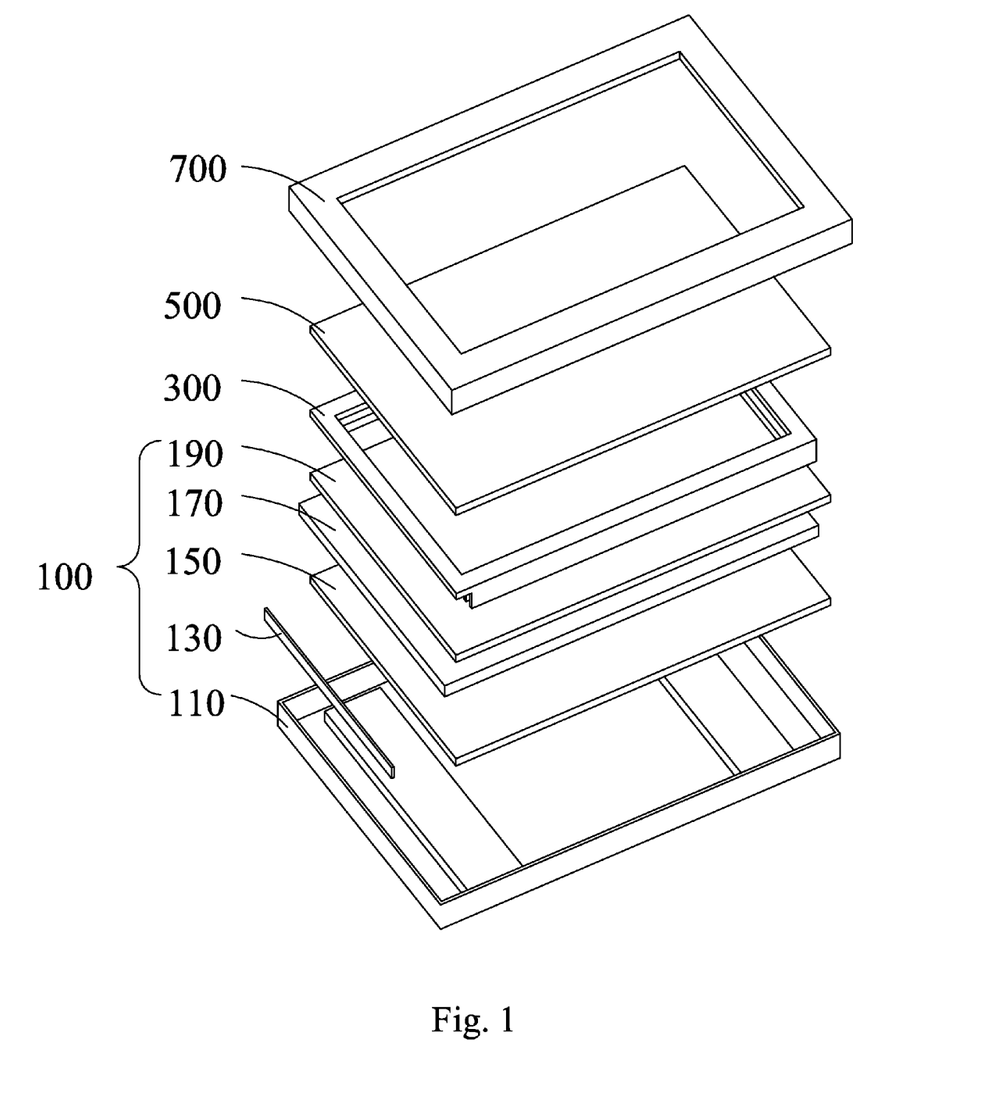
FIG. 1 is an exploded view showing a conventional liquid crystal display.
Figure 2:
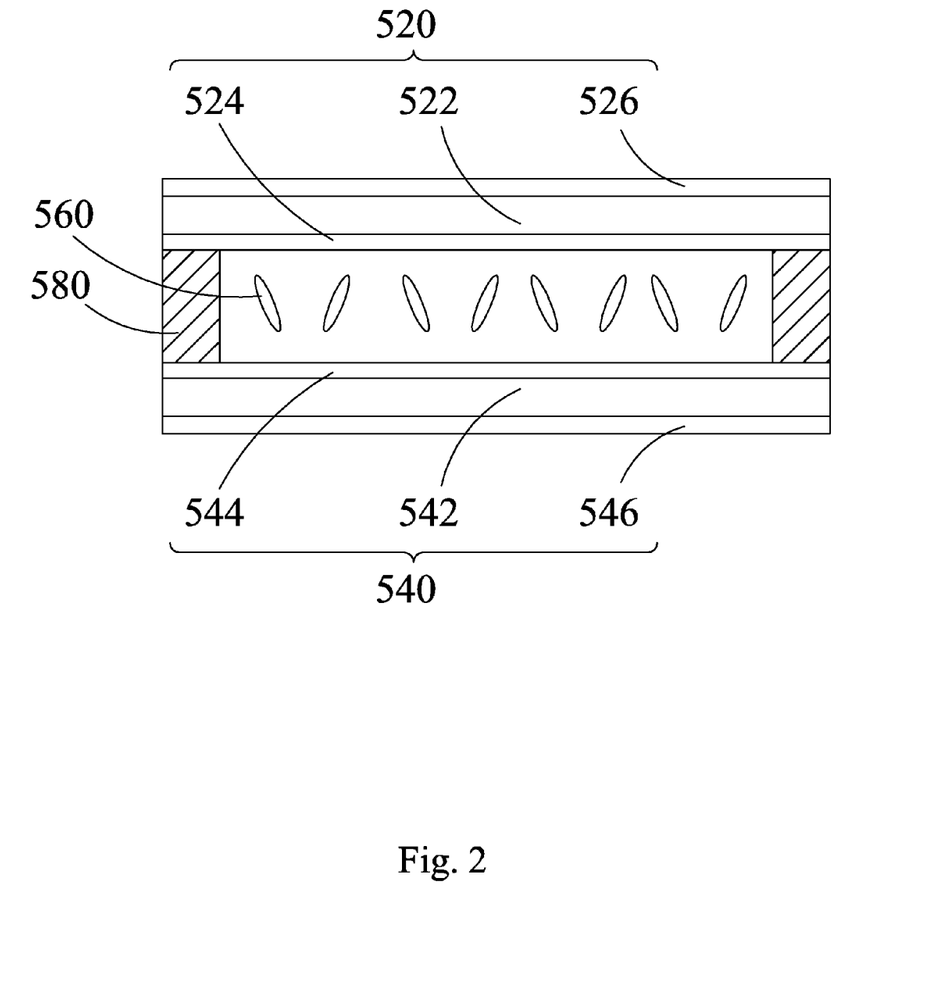
FIG. 2 is a schematic view showing the structure of a conventional liquid crystal display panel.
Figure 3:
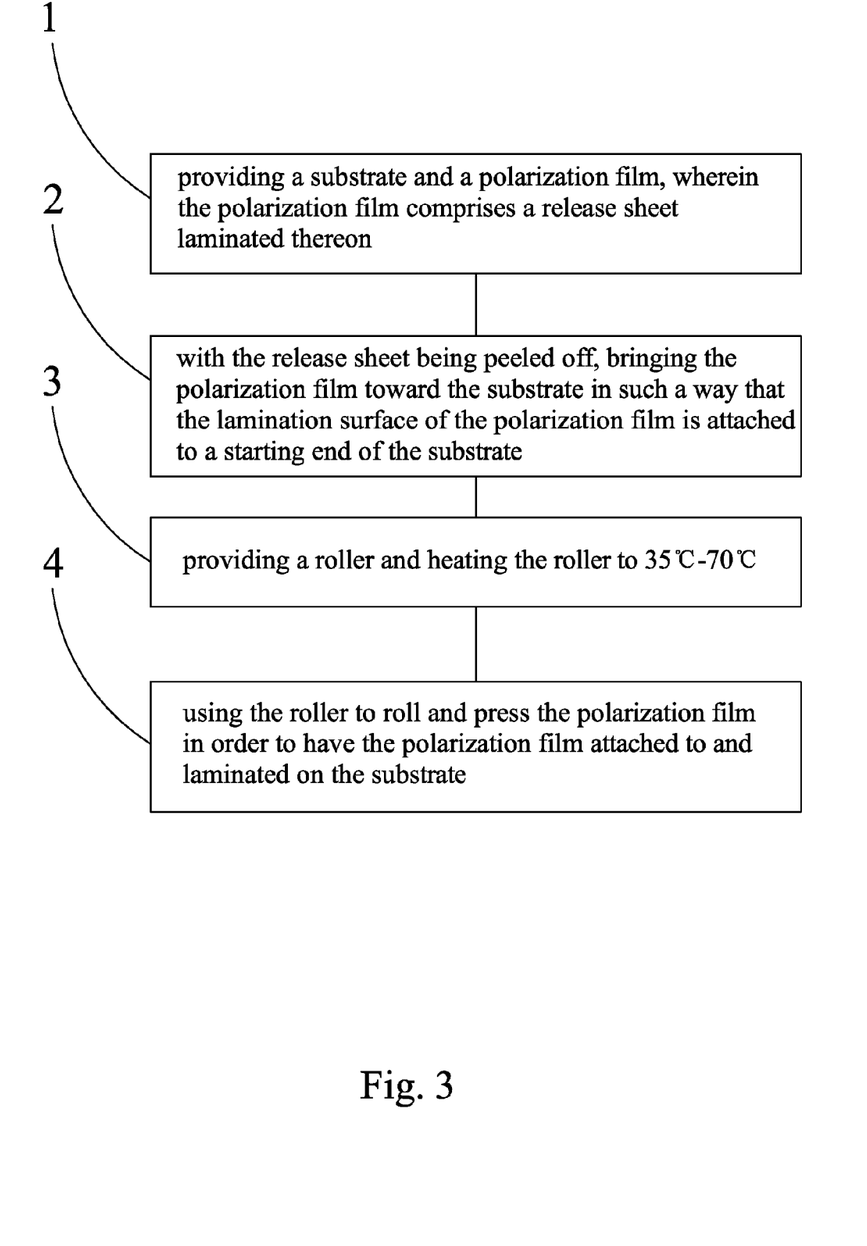
FIG. 3 is a flow chart illustrating a method for laminating a polarization film according to the present invention.

Referring to FIG. 1, a liquid crystal display generally comprises: a backlight module 100, a mold frame 300 mounted on the backlight module 100, a liquid crystal display panel 500 positioned on the mold frame 300, and a bezel 700 mounted on the liquid crystal display panel 500. The backlight module 100 comprises: a backplane 110, a backlight source 130 mounted in the backplane 110, a reflection sheet 150 arranged in the backplane 110, a light guide plate 170 arranged above the reflection sheet 150, and an optic film assembly 190 arranged above the light guide plate 170. The mold frame 300 carries and supports the liquid crystal display panel 500 and the bezel 700 and the backplane 110 of the backlight module 100 are fixed together to form the liquid crystal display. A conventional liquid crystal display panel 500 (as shown in FIG. 2) comprises a color filter (CF) substrate 520, a thin-film transistor (TFT) substrate 540 that is opposite to and bonded to the CF substrate 520, liquid crystal 560 interposed between the CF substrate 520 and the TFT substrate 540, and a sealing frame 580 that is arranged between the CF substrate 520 and the TFT substrate 540 and is located along a circumferential margin of the CF substrate 520. The CF substrate 520 comprises a first glass substrate 522, a color filter 524 formed on a surface of the first glass substrate 522 that faces the TFT substrate 540 and a first polarization film 526 formed on a surface of the first glass substrate 522 that is away from the TFT substrate 540. The TFT substrate 540 comprises a second glass substrate 542, a thin-film transistor 544 formed a surface of the second glass substrate 542 that faces the CF substrate 520, and a second polarization film 546 formed on a surface of the second glass substrate 542 that is away from the CF substrate 520. Light emitting from the backlight module 100 passes through and is polarized by the second polarization film 546 and then enters the liquid crystal 560, whereby the molecules of the liquid crystal 560 are driven by the TFT transistor 544 to rotate, so as to have the light incident onto the CF substrate 520 to be then polarized by the first polarization film 526 and projected out, allowing human eyes to see images displayed on the liquid crystal display panel 500.

Conventionally, a polarization film is laminated on a glass substrate by being pressed by a roller of a polarization film lamination machine and is then subjected to a de-bubbling process to remove air bubbles present between the polarization film and the glass substrate in order to have the polarization film tightly and flat laminated on the glass substrate and to eliminate the influence of displaying performance by the air bubbles. However, the conventionally used process that uses the roller of the polarization film lamination machine to press and laminate and thus attach the polarization film to the glass substrate generally causes more air bubbles between the polarization film and the glass substrate, making the de-bubbling process complicated in operation, consuming extended time, thereby leading to low manufacture efficiency and high manufacture cost of the liquid crystal display panel.

SUMMARY OF THE INVENTION

An object of the present invention is to provide a method for laminating a polarization film, which effectively prevents the generation of air bubbles so as to increase the manufacture efficiency to a great extent and lower down the manufacture cost.

To achieve the above object, the present invention provides a method for laminating a polarization film, which comprises the following steps:

(1) providing a substrate and a polarization film, wherein the polarization film comprises a release sheet laminated thereon;

(2) with the release sheet being peeled off, bringing the polarization film toward the substrate in such a way that the lamination surface of the polarization film is attached to a starting end of the substrate;

(3) providing a roller and heating the roller to 35° C.-70° C.; and (4) using the roller to roll and press the polarization film in order to have the polarization film attached to and laminated on the substrate.

The roller comprises a body and a heating device arranged in the body.

The heating device comprises a hot water pipe.

The heating device receives hot water supplied from an external water circulation system.

The external water circulation system comprises a water circulation pipe, heating facility arranged in the water circulation pipe, cooling facility arranged in the water circulation pipe, and a control system electrically connected to the heating facility.

In step (2), lamination of the polarization film to the substrate is a lamination process carried out with the substrate set horizontal or the substrate set vertical.

The roller is made of a material having temperature resistance, insulation property, and Shore hardness A between 10-98.

The roller is made of a plastic material.

The roller is made of Teflon.

In step (3), the roller is heated to 60° C. and in step (4), the roller, when pressing and laminating the polarization film, is kept at a temperature of 60° C. until the lamination is completed.

The present invention also provides a method for laminating a polarization film, which comprises the following steps:

(1) providing a substrate and a polarization film, wherein the polarization film comprises a release sheet laminated thereon;

(2) with the release sheet being peeled off, bringing the polarization film toward the substrate in such a way that the lamination surface of the polarization film is attached to a starting end of the substrate;

(3) providing a roller and heating the roller to 35° C.-70° C.; and (4) using the roller to roll and press the polarization film in order to have the polarization film attached to and laminated on the substrate; and wherein the roller comprises a body and a heating device arranged in the body;

wherein the heating device comprises a hot water pipe;

wherein the heating device receives hot water supplied from an external water circulation system;

wherein the external water circulation system comprises a water circulation pipe, heating facility arranged in the water circulation pipe, cooling facility arranged in the water circulation pipe, and a control system electrically connected to the heating facility;

wherein in step (2), lamination of the polarization film to the substrate is a lamination process carried out with the substrate set horizontal or the substrate set vertical;

wherein the roller is made of a material having temperature resistance, insulation property, and Shore hardness A between 10-98;

wherein the roller is made of a plastic material;

wherein the roller is made of Teflon; and wherein in step (3), the roller is heated to 60° C. and in step (4), the roller, when pressing and laminating the polarization film, is kept at a temperature of 60° C. until the lamination is completed.

The efficacy of the present invention is that the present invention provides a method for laminating a polarization film, in which a roller is formed by selecting and using a material that shows temperature resistance and insulation and has a predetermined hardness and a heating device is arranged in the roller, so that the roller, when used to press and laminate a polarization film to a substrate, is kept at a temperature of 35° C.-70° C. and thus the polarization film is sufficiently heated during the process when the roller is pressing and laminating the polarization film to effectively prevent air bubbles from occurring between the polarization film and the substrate, effectively shorten a subsequent de-bubbling process carried out by a de-bubbling device thereby increasing, to a great extent, the manufacture efficiency and lower down the manufacture cost.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 6:
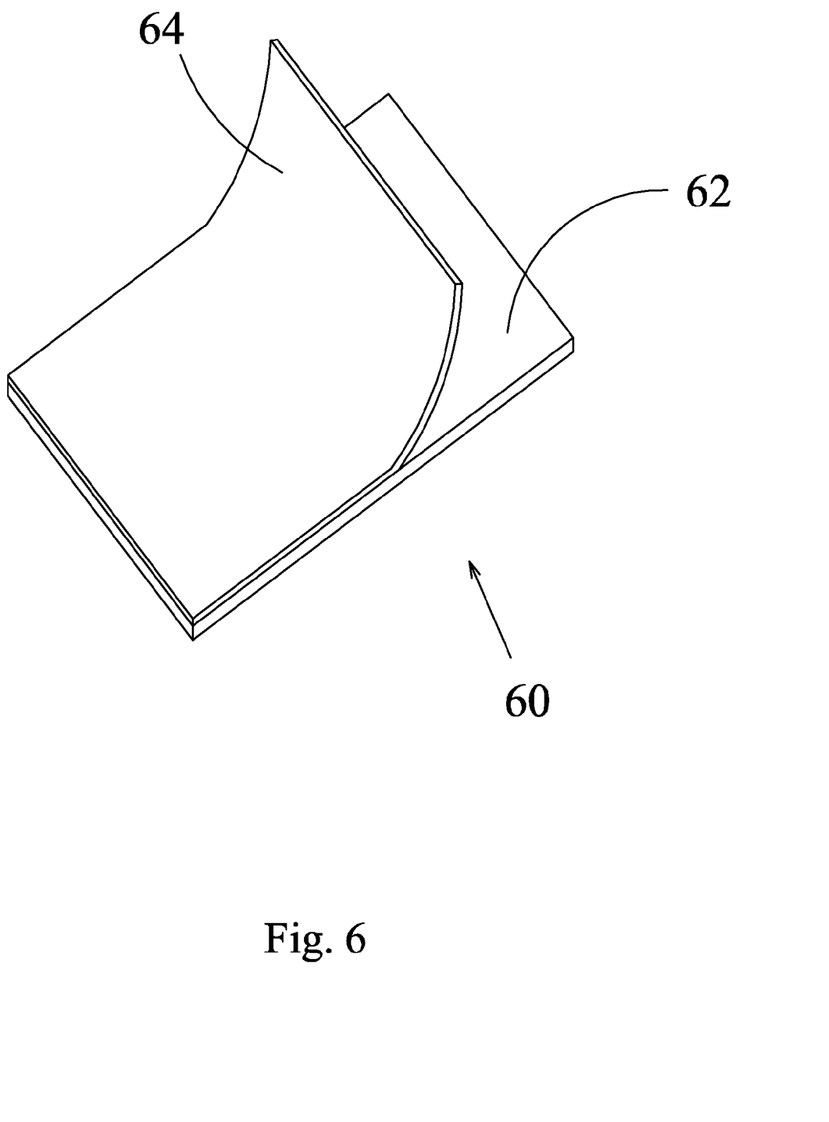
FIG. 6 is a perspective view illustrating a polarization film used in the method for laminating a polarization film according to the present invention.

Referring to FIGS. 3-6, the present invention provides a method for laminating a polarization film, which comprises the following steps:

Step 1: providing a substrate 40 and a polarization film 60, wherein the polarization film 60 comprises a release sheet 64 laminated thereon.

The substrate 40 is a transparent substrate and is preferably a glass substrate. The polarization film 60 has a lamination surface 62 to which the release sheet 64 is laminated to ensure cleanliness of the lamination surface 62.

Figure 4:
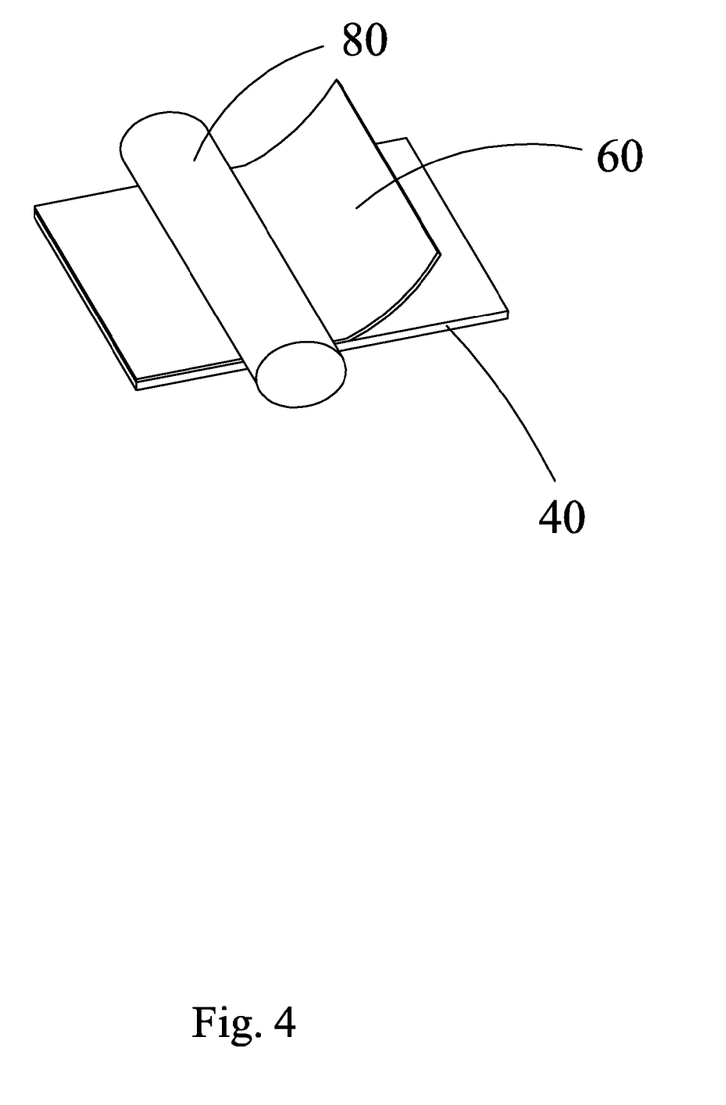
FIG. 4 is a perspective view illustrating a roller being used to press and laminate a polarization film in the method for laminating a polarization film according to the present invention.

Step 2: with the release sheet 64 being peeled off, bringing the polarization film 60 toward the substrate 40 in such a way that the lamination surface 62 of the polarization film 60 is attached to a starting end of the substrate 40. In an actual operation, for the polarization film 60 to be laminated on the substrate 40, the substrate 40 can be laid horizontal or vertical and the actual situation is determined by the machine used, but both can achieve the technical effectiveness of the present invention.

Step 3: providing a roller 80 and heating the roller 80 to 35° C.-70° C., preferably the roller 80 being heated to 60° C.

Figure 5:
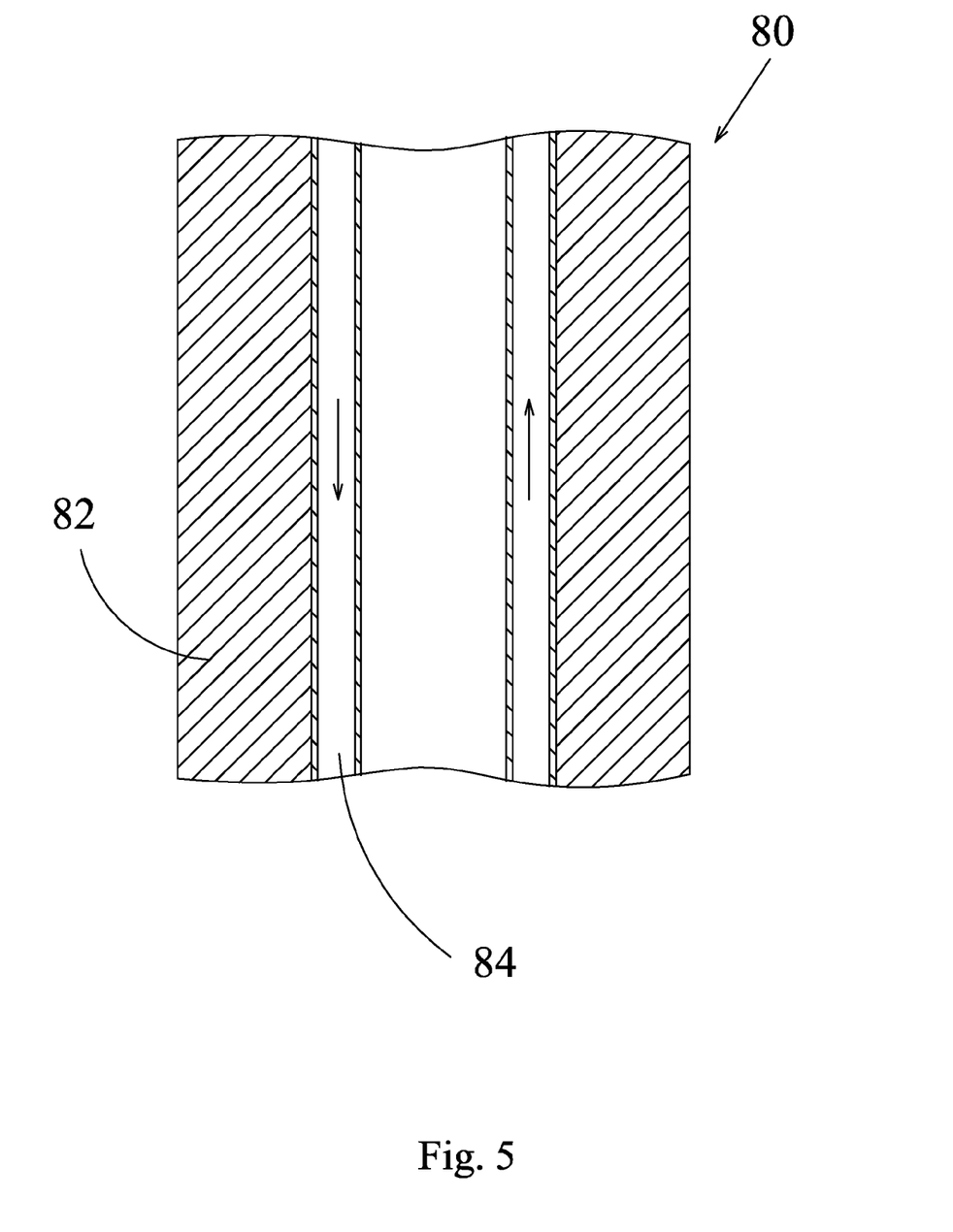
FIG. 5 is a partial cross-sectional view showing an embodiment of the roller used in the method for laminating a polarization film according to the present invention.

The roller 80 comprises a body 82 and a heating device 84 arranged in the body 82. The body 82 is made of a material that is temperature-resistant and insulative and has Shore hardness A between 10-98. In the instant embodiment, the body 82 of the roller 80 is made of a plastic material, which can be ordinary plastics or special plastics and is preferably Teflon of fluorine plastics. The hardness of these materials is slightly higher than the conventionally used rubber and the properties of temperature resistance and insulation are also better, helping increasing pressure applied to the polarization film 60 for prevent, as much as possible, the occurrence of air bubbles between the polarization film 60 and the substrate 40.

The heating device 84 may comprises a hot water pipe. The heating device 84 is supplied with hot water from an external water circulation system (not shown). The external water circulation system may be composed of a water circulation pipe, heating facility arranged in the water circulation pipe, cooling facility arranged in the water circulation pipe, and a control system electrically connected to the heating facility.

The hot water pipe and the external water circulation system can be realized with any known techniques and an example is provided in FIG. 5 for illustration of the operation principle. In the drawing, arrows shown inside the heating device 84 indicate the directions of water flows. The control system of the external water circulation system controls the heating facility to heat the water flowing through the water circulation pipe and the heated water flows via an inlet of the hot water pipe to get into the hot water pipe to heat the body 82 of the roller 80. Afterwards, the water flows via an outlet of the hot water pipe into the water circulation pipe and is cooled by the cooling facility for subsequent use.

Step 4: using the roller 89 to roll and press the polarization film 60 in order to have the polarization film 60 attached to and laminated on the substrate 40.

During the pressing operation of the roller 80 acting on the polarization film 60, the roller 80 is kept at a temperature of 35° C.-70° C., preferably, the temperature of the roller 80 being set around 60° C., until the lamination operation is completed, whereby the roller 80, while pressing and laminating the polarization film 60, simultaneously heats the polarization film 60 so as to soften the polarization film 60 for reducing or eliminating air bubbles between the polarization film 60 and the substrate 40 and thus shortening the time period required for a subsequent de-bubbling process or even totally eliminating the de-bubbling process to thereby increases, to a great extent, the manufacture efficiency and reduce the manufacture cost.

In summary, the present invention provides a method for laminating a polarization film, in which a roller is formed by selecting and using a material that shows temperature resistance and insulation and has a predetermined hardness and a heating device is arranged in the roller, so that the roller, when used to press and laminate a polarization film to a substrate, is kept at a temperature of 35° C.-70° C. and thus the polarization film is sufficiently heated during the process when the roller is pressing and laminating the polarization film to effectively prevent air bubbles from occurring between the polarization film and the substrate, effectively shorten a subsequent de-bubbling process carried out by a de-bubbling device thereby increasing, to a great extent, the manufacture efficiency and lower down the manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for laminating a polarization film, comprising the following steps:
   (1) providing a substrate and a polarization film, wherein the polarization film comprises a release sheet laminated thereon;
   (2) with the release sheet being peeled off, bringing the polarization film toward the substrate in such a way that the lamination surface of the polarization film is attached to a starting end of the substrate;
   (3) providing a roller and heating the roller to 35° C.-70° C.; and
   (4) softening the polarization film with the heated roller and at the same time, using the roller to roll and press the softened polarization film in order to have the polarization film attached to and laminated on the substrate.

2. The method for laminating a polarization film as claimed in claim 1, wherein the roller comprises a body and a heating device arranged in the body.

3. The method for laminating a polarization film as claimed in claim 2, wherein the heating device comprises a hot water pipe.

4. The method for laminating a polarization film as claimed in claim 3, wherein the heating device receives hot water supplied from an external water circulation system.

5. The method for laminating a polarization film as claimed in claim 4, wherein the external water circulation system comprises a water circulation pipe, heating facility arranged in the water circulation pipe, cooling facility arranged in the water circulation pipe, and a control system electrically connected to the heating facility.

6. The method for laminating a polarization film as claimed in claim 1, wherein in step (2), lamination of the polarization film to the substrate is a lamination process carried out with the substrate set horizontal or the substrate set vertical.

7. The method for laminating a polarization film as claimed in claim 1, wherein the roller is made of a material having temperature resistance, insulation property, and Shore hardness A between 10-98.

8. The method for laminating a polarization film as claimed in claim 7, wherein the roller is made of a plastic material.

9. The method for laminating a polarization film as claimed in claim 8, wherein the roller is made of a fluorine plastic material.

10. The method for laminating a polarization film as claimed in claim 1, wherein in step (3), the roller is heated to 60° C. and in step (4), the roller, when pressing and laminating the polarization film, is kept at a temperature of 60° C. until the lamination is completed.

11. A method for laminating a polarization film, comprising the following steps:
   (1) providing a substrate and a polarization film, wherein the polarization film comprises a release sheet laminated thereon;
   (2) with the release sheet being peeled off, bringing the polarization film toward the substrate in such a way that the lamination surface of the polarization film is attached to a starting end of the substrate;
   (3) providing a roller and heating the roller to a predetermined temperature in the range of 35° C.-70° C.; and
   (4) softening the polarization film with the heated roller and at the same time, using the roller to roll and press the softened polarization film in order to have the polarization film attached to and laminated on the substrate; and
   wherein the roller comprises a body and a heating device arranged in the body;
   wherein the heating device comprises a hot water pipe;
   wherein the heating device receives hot water supplied from an external water circulation system;
   wherein the external water circulation system comprises a water circulation pipe, heating facility arranged in the water circulation pipe, cooling facility arranged in the water circulation pipe, and a control system electrically connected to the heating facility;
   wherein in step (2), lamination of the polarization film to the substrate is a lamination process carried out with the substrate set horizontal or the substrate set vertical;
   wherein the roller is made of a material having temperature resistance, insulation property, and Shore hardness A between 10-98;
   wherein the roller is made of a plastic material; and
   wherein in step (4), the roller, when pressing and laminating the polarization film, is kept at the predetermined temperature until the lamination is completed.

* * * * *